United States Patent [19]
Osiadacz

[11] 3,971,088
[45] July 27, 1976

[54] AUTOMATED MEAT TENDERIZATION SYSTEM

[75] Inventor: William J. Osiadacz, Hoffman Estates, Ill.

[73] Assignee: Baxter Laboratories, Inc., Deerfield, Ill.

[22] Filed: Dec. 9, 1974

[21] Appl. No.: 530,671

[52] U.S. Cl. .................................................. 17/25
[51] Int. Cl.² ........................................... A22C 9/00
[58] Field of Search ..................... 17/25, 28; 99/254

[56] References Cited
UNITED STATES PATENTS

| | | | |
|---|---|---|---|
| 3,066,350 | 12/1962 | Quiring | 17/25 |
| 3,256,801 | 6/1966 | Greenspan | 99/254 |
| 3,334,377 | 8/1967 | Soodalter | 17/28 |
| 3,334,570 | 8/1967 | Nordin et al. | 17/25 |
| 3,736,583 | 5/1973 | Smith | 17/25 |

*Primary Examiner*—G.E. McNeill
*Attorney, Agent, or Firm*—Louis Altman; Lawrence W. Flynn; Max D. Hensley

[57] ABSTRACT

An improved meat tenderizing system is provided in which a pair of oppositely positioned carriage assemblies, each carrying a number of needle manifolds, is operated to align injection needles with a carcass that is conveyed in a longitudinal path intermediate the carriage assemblies. At least some of the needles are pivotable so as to direct the injection needles into the carcass at a desirable angle.

A metered amount of tenderizing solution is automatically fed to the needle manifolds when the needles enter the carcass. After the metered amount of solution has been injected, the needles are automatically withdrawn and the carcass is conveyed for further processing.

22 Claims, 10 Drawing Figures

FIG. I

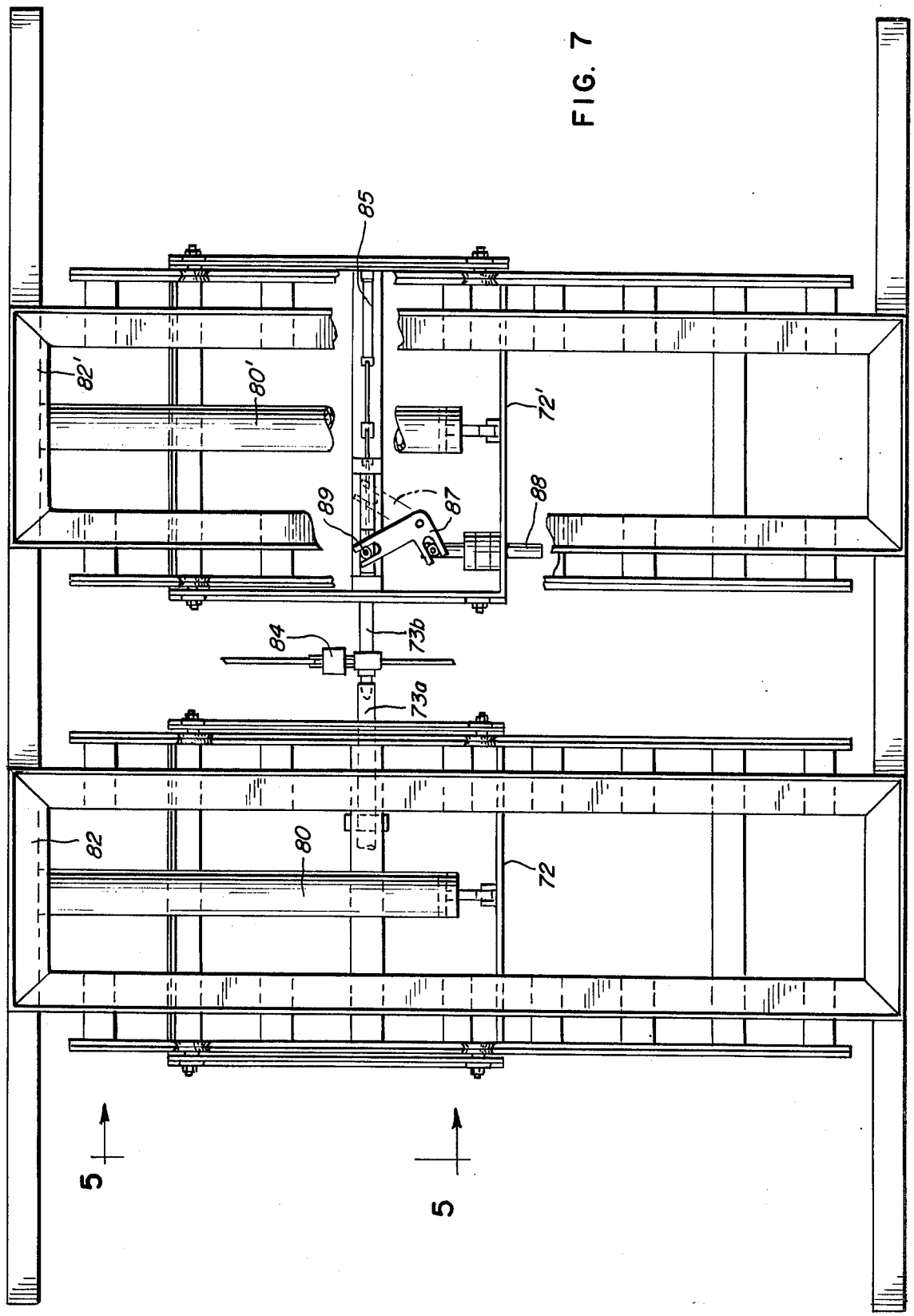

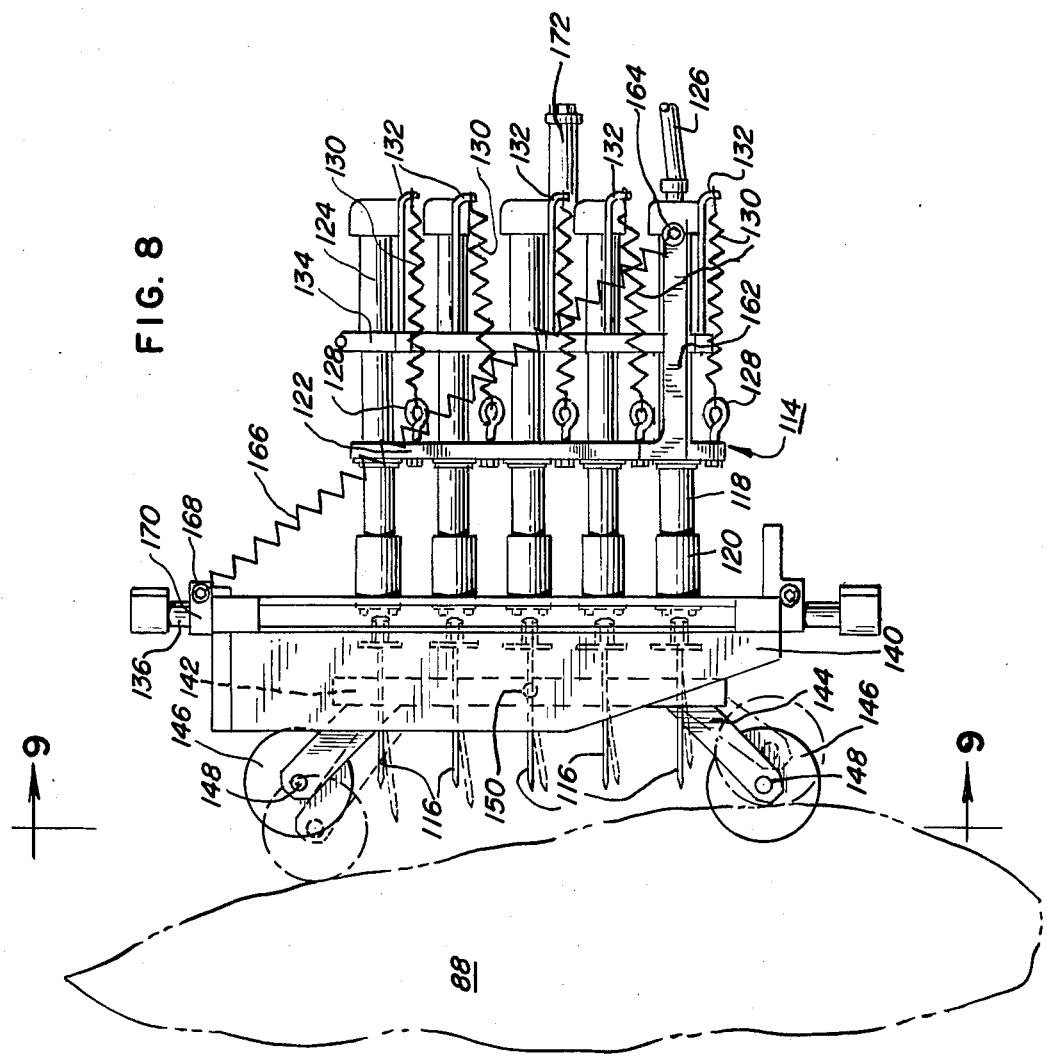
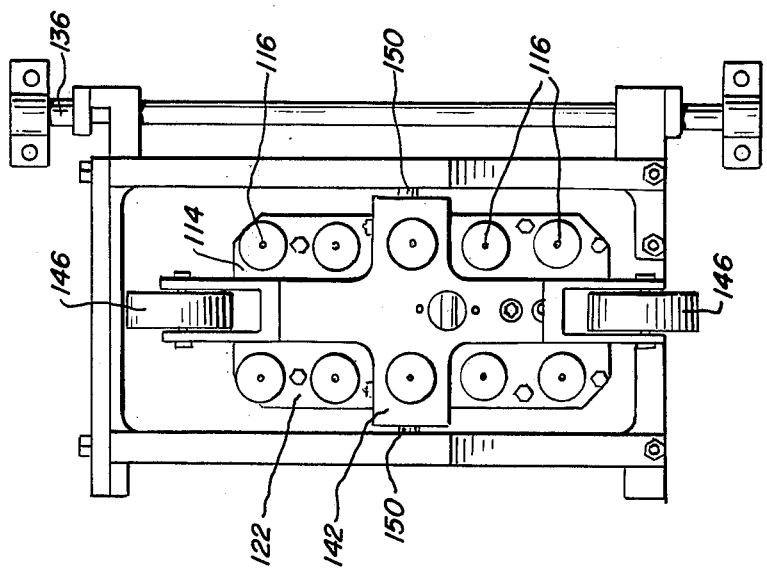

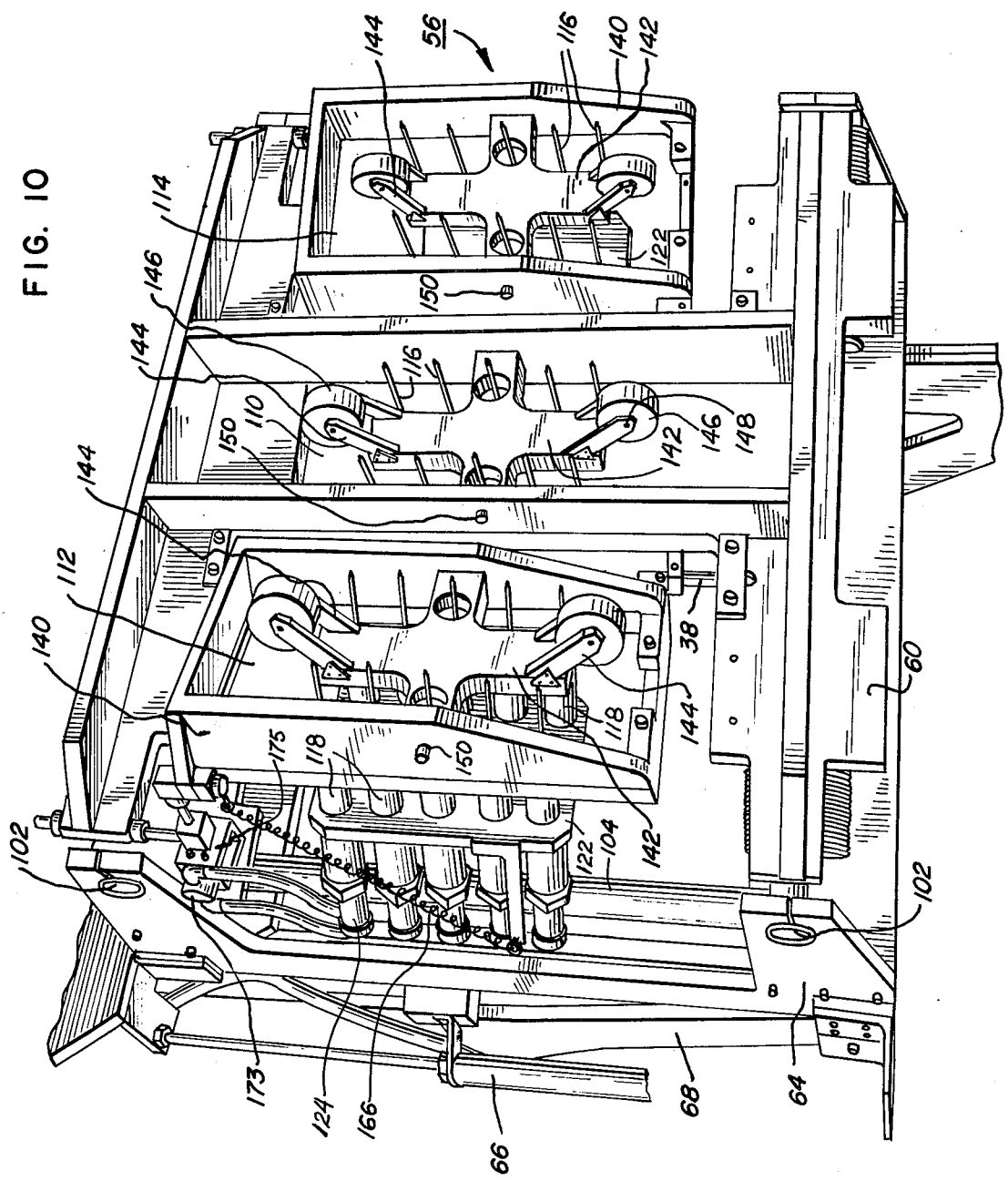

AUTOMATED MEAT TENDERIZATION SYSTEM

BACKGROUND OF THE INVENTION

This invention relates to an improved system for tenderizing meat by injecting an enzyme solution immediately after slaughter.

Prior art beef tenderizing techniques include the injection of an enzyme solution into the beef immediately after slaughter while the carcass is still within the body temperature range. The quantity of the enzyme solution injection must be equal to a selected percentage of the weight of the meat unit. If too much enzyme solution is used, the meat may have excess moisture or may be too tender. On the other hand, if too little solution is used, the tenderization may be ineffective. Further, Federal regulations presently prohibit injection of more enzyme solution than 2.6 percent of the weight of the carcass.

In prior art meat tenderizing apparatus of the enzyme injection type, typically the carcass is conveyed past a number of injection stations. At each injection station, there is positioned one or more operators who inject the carcass with enzyme solution. Each operator has manual control over a header carrying a number of injection needles and coupled to a source of enzyme solution.

A need has been recognized for a meat tenderizing system which is less dependent upon the actions of a number of individual operators and is automated to increase process efficiency and productivity. Therefore, an object of the present invention is to provide an automated meat tenderization system which overcomes certain of the difficulties concomitant with individual action by a number of operators.

A further object of the present invention is to provide an automated meat tenderizing system which is relatively simple in construction and efficient in operation.

Another object of the present invention is to provide an automated meat tenderizing system in which metered amounts of tenderizing solution are provided for injection.

A further object of the present invention is to provide an automated meat tenderizing system in which in one stage of the operation, injection needles are mechanically operated to provide satisfactory tenderizing injection of a carcass conveyed to that station, without the need for the needle headers to be controlled by an operator.

A further object of the present invention is to provide a meat tenderizing system in which a station thereof is automated to sense the carcass, direct the injection needles into the carcass, inject a metered amount of tenderizing solution into the carcass, and automatically withdraw the injection needles from the carcass after such injection.

Other objects and advantages of the present invention will become apparent as the description proceeds.

SUMMARY OF THE INVENTION

In accordance with the present invention, a meat tenderizing system is provided in which the tenderizing solution is injected into a carcass after slaughter. The improvement comprises a carriage assembly carrying a needle manifold with a plurality of generally parallel injection needles coupled to the manifold. Means are provided for conveying the carcass along a path transverse to the axes of the injection needles.

Means are provided for driving the carriage assembly along a track. Control means are provided for actuating the driving means and means are provided for driving the needle manifold toward and away from the carcass.

In the illustrative embodiment, individual springs are coupled to individual injection needles to spring-load the needles individually with respect to the manifold.

The illustrative embodiment includes a second carriage assembly carrying a needle manifold with a plurality of generally parallel injection needles and with the second carriage assembly being oppositely positioned with respect to the first mentioned carriage assembly so as to permit the carcass to be conveyed along a longitudinal path intermediate the first mentioned carriage assembly and the second carriage assembly.

In the illustrative embodiment, each carriage assembly carries a plurality of spaced needle manifolds, with at least one of the needle manifolds being pivotable with respect to the carriage assembly about a vertical axis and with the pivotable carriage assembly including means for sensing the contour of the carcass.

A more detailed explanation of the invention is provided in the following description and claims, and is illustrated in the accompanying drawings.

BRIEF DESCRIPTION OF THE DRAWINGS

FIG. 7 is a fragmentary, top plan view of the system of FIG. 3;

FIG. 8 is a side elevational view of a needle and manifold assembly, showing the sensing of a carcass;

FIG. 9 is a front elevational view of the injection needle and manifold assembly of FIG. 8, taken along the line 9—9 of FIG. 8; and FIG. 10 is a perspective view of a portion of a carriage assembly.

DETAILED DESCRIPTION OF THE ILLUSTRATIVE EMBODIMENT

Figure 1:
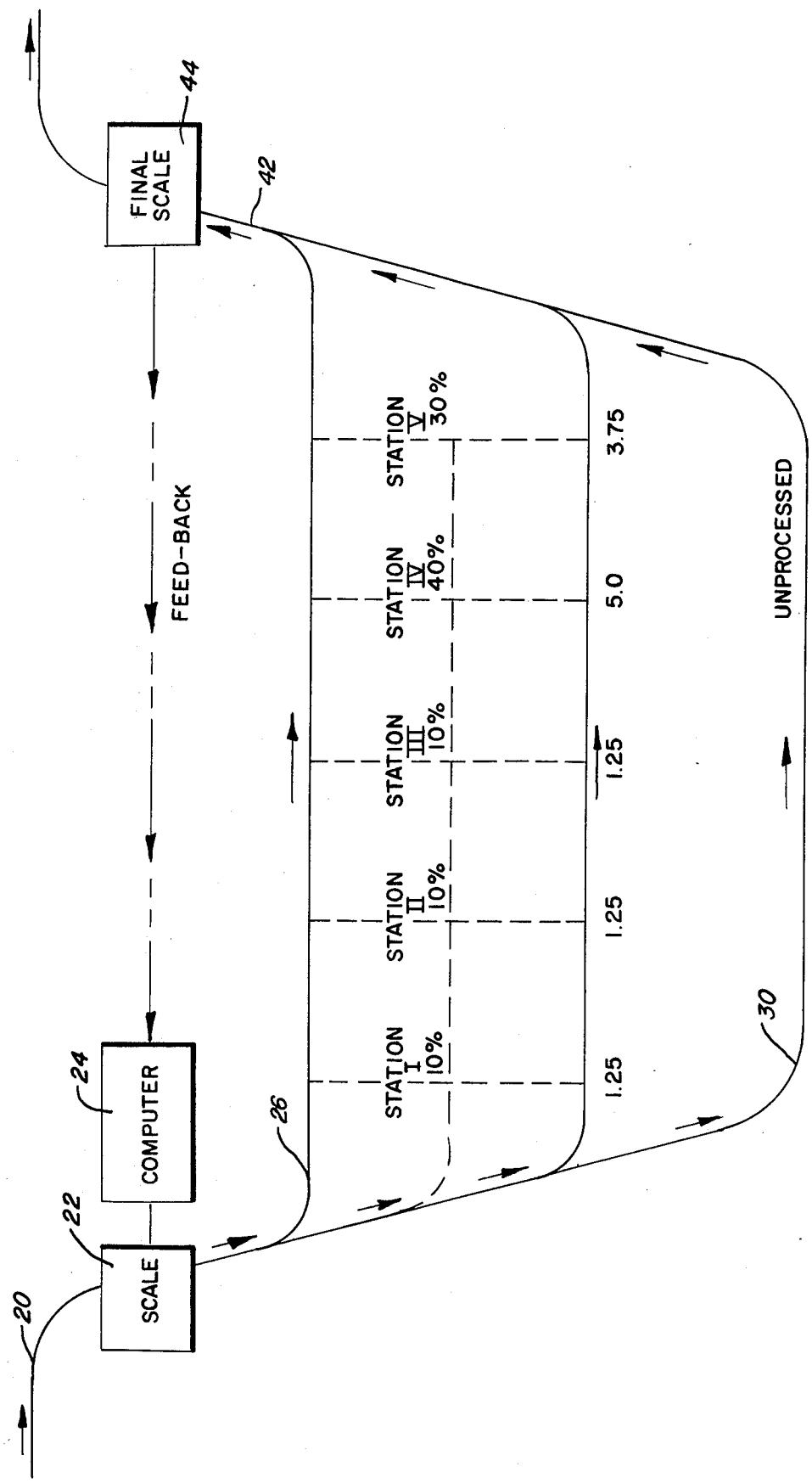
FIG. 1 is a schematic flow diagram of the meat tenderizing system of the present invention.

Referring to the drawings and first to FIG. 1 in particular, split carcasses are routed from the wash tunnel and transferred to a standard beef rail 20. While traveling the beef rail, each carcass (left and right side) is weighed by means of scale 22. The carcass weight (total of the left and right sides) is entered into data storage unit 24, which may comprise a programmed computer. Storage unit 24 automatically programs a fluid injection system to dispense tenderizing solution in accordance with a calibrated percentage of the carcass weight.

For purpose of ease in understanding the distribution of tenderizing solution, it will be assumed that a carcass weighing 1,000 pounds (total weight of left and right sides) is being processed. The meat tenderizing system is calibrated so that a maximum amount of solution equal to 2.5 percent of the carcass weight can be injected. In other words, the system is calibrated to inject 25 pounds of tenderizing solution into a 1,000 pound carcass, with 12.5 pounds of tenderizing solution being injected into the right side and 12.5 pounds of tenderizing solution being injected into the left side.

Utilizing the system of the present invention, it is preferred that five injection stations be employed. These injection stations are illustrated in FIG. 1, with the indicated percentage of the solution, to be injected at each station, set forth in the FIG. 1 diagram. For example, at station I, 10 percent of the tenderizing solution is to be injected. Thus with the 1,000 pound carcass example, 1.25 pounds of tenderizing solution will be injected into the right side and 1.25 pounds of tenderizing solution will be injected into the left side at station I. Likewise, at each of stations II and III, 10 percent of the tenderizing solution will be injected into the carcass being conveyed. At station IV, 40 percent of the tenderizing solution will be injected. Thus at station IV, five pounds of tenderizing solution will be injected into the right side (of the 1,000 pound carcass example) and 5 pounds of the tenderizing solution will be injected into the left side. At station V, 30 percent of the tenderizing solution will be injected.

After the carcass is weighed by scale 22, the left side of beef is transferred to rail 26 and the right side is transferred to rail 28. Where carcasses are not to be processed, they are transferred to rail 30 which bypasses the injection stations.

Figure 2:
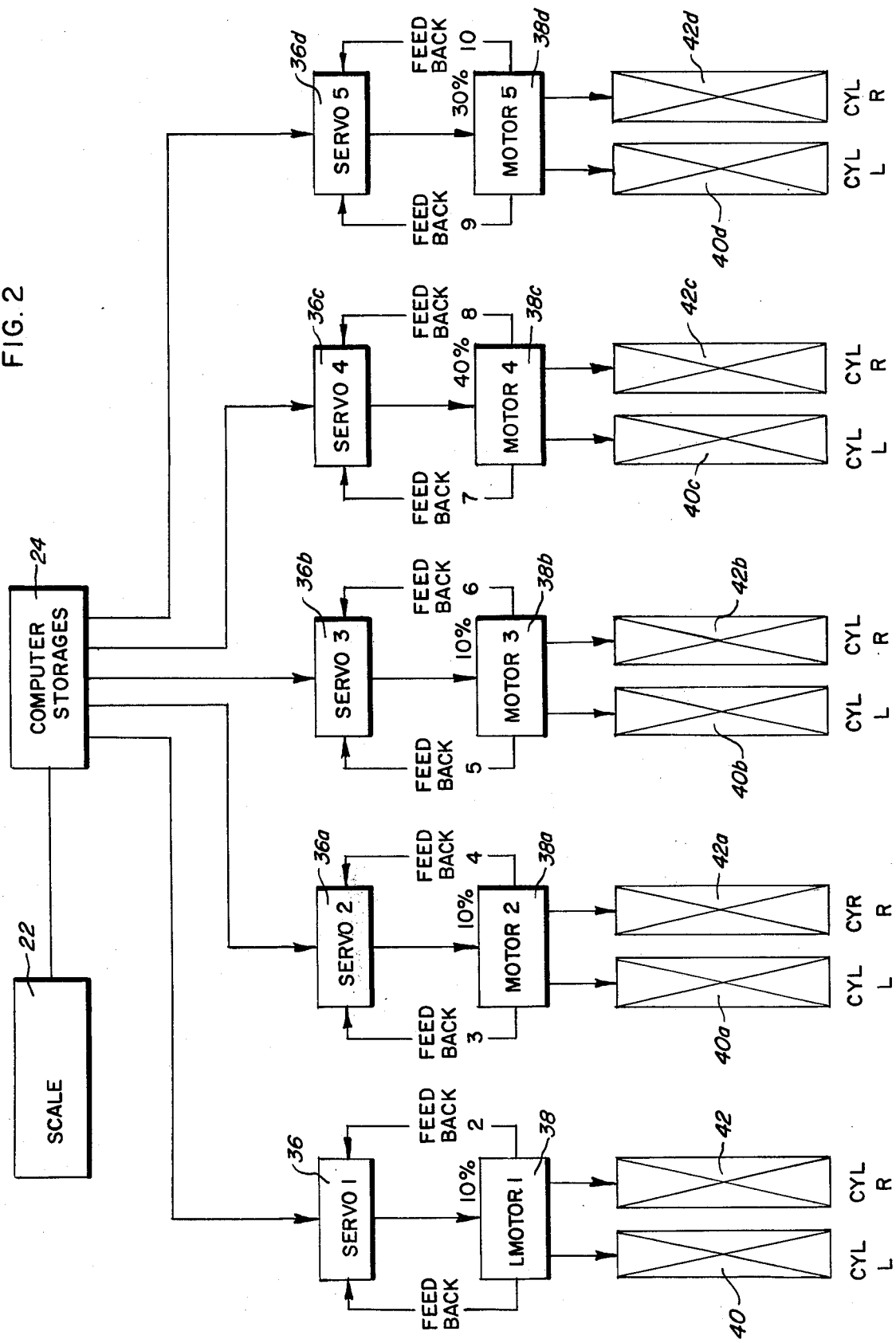
FIG. 2 is a schematic block diagram of the automatic solution measuring system of the present invention.

Each injection station employs two operators performing identical functions. One operator operates on the left carcass side and the other operator operates on the right carcass side. Referring now to FIG. 2, it is seen that volumetric cylinders are utilized to pump tenderizing fluid into injection needle manifolds to which the injection needles are coupled. Each station utilizes a volumetric cylinder for the left side injection needles and a separate volumetric cylinder for the right side injection needles. However, the left side volumetric cylinder and the right side volumetric cylinder are driven by a common injection pump motor and coupled servo-mechanism. Thus at station I, storage device 24 transmits a signal to servo-mechanism 36 which is coupled to drive motor 38. Motor 38 controls left side volumetric cylinder 40 and right side volumetric cylinder 42.

When the carcass sides reach station I, the operators manually place the injection needles into the prescribed shoulder areas of the carcass sides. The trolley carrying the carcass sides depresses a microswitch which actuates servo-mechanism 36 to drive motor 38. This servo-motor operates upon a signal from storage device 24 to turn until the prescribed 10 percent (2.5 pounds) of tenderizing solution has been delivered to the combined left and right sides (1.25 pounds of solution per side). The amount (volume) of solution and time of injection are determined and controlled by the programmed system utilizing the weight of the carcass input and the operators at station I have no control over these parameters. An indicating light, readily visible to the operators, is turned on as the injection cycle begins and shuts off at cycle completion, thus signaling the operators that the injection needles may be withdrawn from the carcass sides.

Stations I, II and III process the forequarter (square cut chuck) sections of the carcasses, station IV the hind quarter (round and loin) sections, and station V processes the forequarter (rib) sections. Thus a similar process as described above with respect to station I occurs in stations II and III, using the same volume and time injection parameters, but with different needle placement, as the carcass sides continue along the line. In FIG. 2, similar reference numerals designate similar structures, but the letter "a" has been added with respect to the station II structure, "b" with respect to station III structure, "c" with respect to station IV, and "d" with respect to station V.

While the injection operation in stations I, II, III and V is manual in that operators manually insert the injection needles into the carcass sides, injection at station IV is semi-automatic in that the operator locates the needle manifolds generally with respect to the carcass sides, but physical insertion of the needles is performed mechanically. Thus the operators in station IV have no control over the injection, volume or time. A more detailed explanation of the injection apparatus at station IV is set forth below.

It is desirable that the amount of tenderizing solution injected be very accurate. In this manner, one can utilize a maximum amount of tenderizing solution without exceeding legal restrictions. To this end, the servo-mechanisms 36 and motors 38 cooperate with volumetric cylinders 40 and 42 to achieve very accurate measurement in the following manner. The amount of tenderizing solution utilized is proportional to the linear movement of the volumetric output. In other words, the length of the linear movement of the cylinders determines the volumetric output thereof. As the shaft of motor 38 turns, the piston of volumetric cylinder 40 moves linearly and it is the function of servo-mechanism 36, as signaled by storage device 24, to control rotational movement of motor 38. Motor 38 has a feedback line to servo-mechanism 36 in order to provide a feedback signal signifying both the velocity and linear movement of the volumetric cylinders. By controlling the velocity of the cylinders, overshooting and injection at overpressure is avoided.

When the carcass reaches station I and the operators have inserted the injection needles into the carcass sides, storage device 24 signals the servo-motor to operate the volumetric cylinders to thereby inject 10 percent of the tenderizing solution into the carcass sides. When the carcass sides are at station II and the injection needles are inserted, storage device 24 signals the servo-motor to operate the volumetric cylinders to inject another 10 percent of the tenderizing solution into the carcass sides. Likewise, when the carcass sides reach stations III, IV and V, the storage device 24 signals the respective servo-motors to operate the respective volumetric cylinders to inject, respectively, 10 percent, 40 percent and 30 percent of the tenderizing solution into the carcass sides. After processing at station V, the carcasses are returned to a main beef rail 42 and weighted on a final scale 44. A signal corresponding to the weight determined by final scale 44 is fed back to storage device 24, which compares the weight with the initial weight determined by scale 22. If the final weight is more than 2.5 percent greater than the initial weight, the storage device 24 is programmed to give signals requiring lower percentage injections at the five stations. Likewise, if the final weight is substantially less than 2.5 percent greater than the initial weight, the storage device 24 is programmed to increase the percentage of tenderizing solution injected.

It is to be understood that the determinations and calculations of scale 22, storage device 24 and final scale 44 could be handled manually. Thus, the carcass could be weighed and an operator could manually determine the amounts of solution which should be injected at the five injection stations. Manual operation of the volumetric cylinders could then be effected to obtain the appropriate injected solution amounts.

Figure 3:
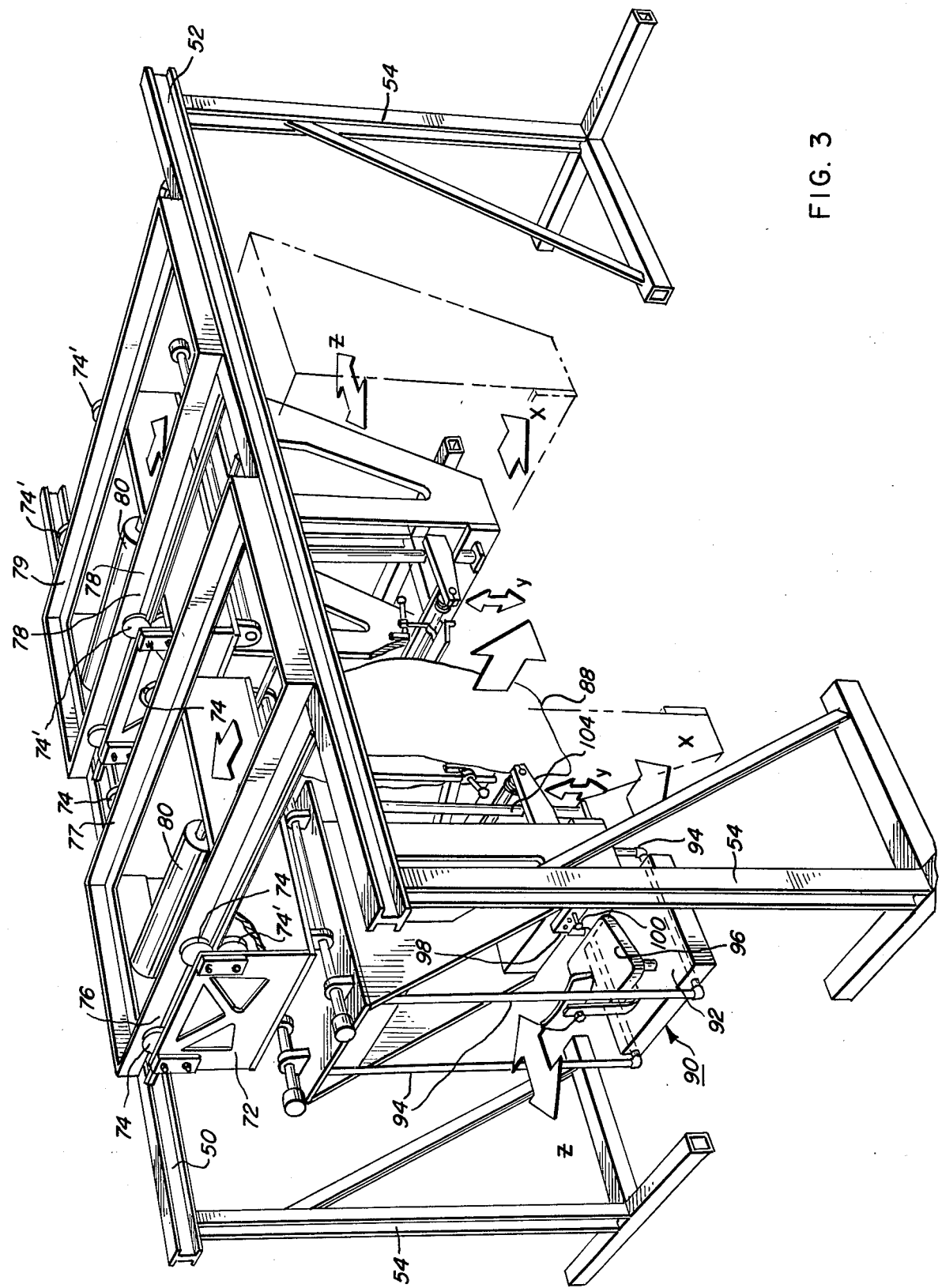
FIG. 3 is a perspective view of an automated station of a meat tenderizing system constructed in accordance with the principles of the present invention.

The apparatus of station IV is illustrated in FIGS. 3–9 of the drawings. Referring to FIG. 3 in particular, the apparatus comprises a main frame formed of horizontally aligned I-beams 50, 52 supported by vertical uprights 54.

The system of the present invention comprises two main carriage assemblies 56 and 58 (FIG. 4), each of which comprises three carriage subassemblies. As shown most clearly in FIGS. 4, 5 and 10, main carriage assembly 56 includes X-direction carriage 60 which is moved by means of a hydraulic cylinder 62, Y-direction carriage 64 which is moved by means of a hydraulic cylinder 66 and Z-direction carriage 68 which is moved by means of a hydraulic cylinder 70. Since carriage assembly 58 is substantially identical to carriage assembly 56 (except that it would be considered substantially the mirror image thereof), like reference numerals with a prime added are utilized for the components of main carriage assembly 58. Thus X-axis carriage 60' is driven by a hydraulic cylinder 62', Y-axis carriage 64' is driven by hydraulic cylinder 66' and Z-axis carriage 68' is driven by hydraulic cylinder 70'.

Figure 5:
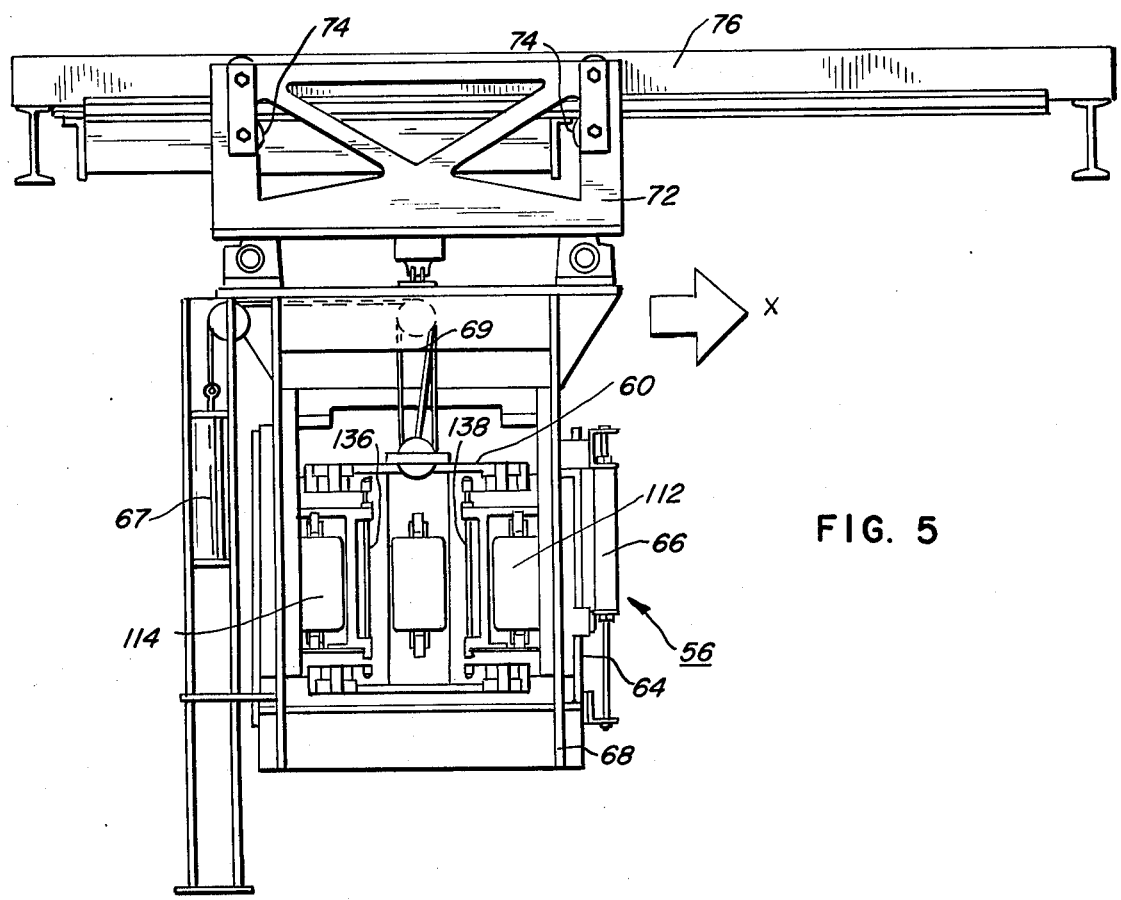
FIG. 5 is a side elevational view taken along the plane of the line 5—5 of FIGS. 4 and 7.

Referring to FIG. 5, a counterbalance 67 and pulley system 69 are used to counterbalance the carriage assembly moving along the Y-axis, thus lessening the load on hydraulic cylinder 66.

Main carriage assemblies 56 and 58 further include main drive assemblies 72 and 72', respectively, which are connected together by means of a carriage connecting sleeve 73a and rod 73b. As shown most clearly in FIGS. 3, 5 and 7, main drive assemblies 72 and 72' carry rollers 74 and 74', respectively, which are guided by tracks 76, 77, 78 and 79 for movement of main drive assemblies 72 and 72' together in the X-axis direction. The X, Y and Z axes directions are illustrative by arrows in FIG. 3, for ease in understanding the operation.

Referring to FIGS. 3 and 7 in particular, it is seen that pneumatic cylinders 80 and 80' are connected to frame 82 and 82', respectively, and to main drive assemblies 72 and 72', to drive the drive assemblies 72 and 72' in the X-axis direction. It is preferred that the pneumatic cylinders 80 and 80' be utilized to retract the main drive assemblies 72 and 72' after the assemblies have been moved forwardly by the beef trolley.

Figure 4:
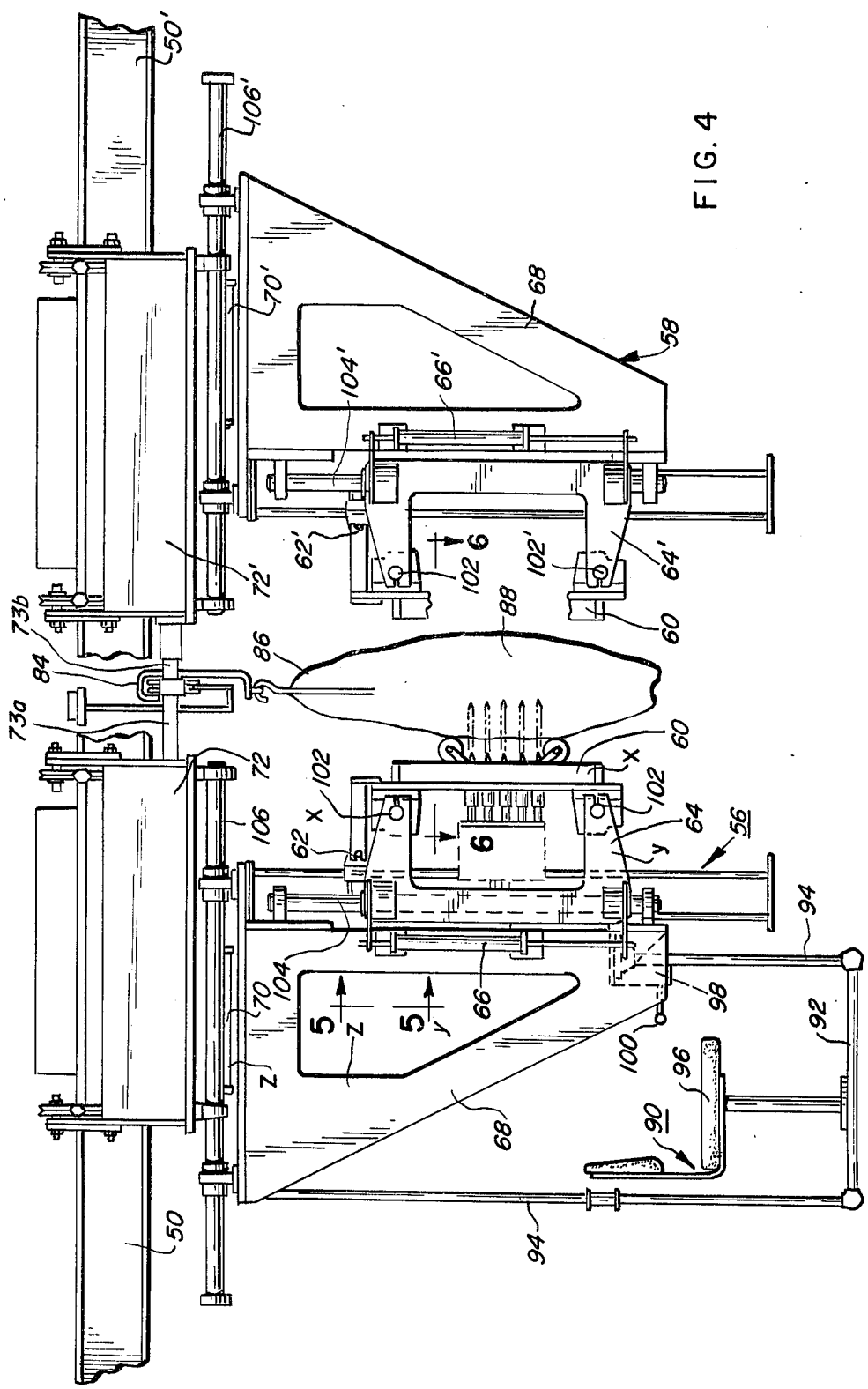
FIG. 4 is a front elevational view thereof.

As shown in FIGS. 4 and 7, a beef trolley 84 to which a beef carrying hook 86 is coupled, is operated by an overhead drop finger conveyor, and is positioned behind carriage connecting sleeve and rod 73a, 73b to abut the carriage connecting members 73a, 73b when trolley reaches station V. In this manner, the beef trolley carrying the carcass side will push the main drive assemblies 72 and 72' forward so that the main drive assemblies and associated carriage assemblies 56 and 58 will travel with the beef trolley 84.

Referring to FIG. 7, after carriage connecting members 73a, 73b have reached their final position, rod 73b is withdrawn from sleeve 73a by means of hydraulic cylinder 85 thereby permitting the beef trolley 84 to pass and move on to station V. Pneumatic cylinders 80, 80' will then operate to retract main drive assemblies 72, 72' to their initial position to receive the next beef trolley carrying a carcass side to be injected. Once main drive assemblies 72, 72' have been retracted to their initial positions, sleeve and rod members 73a and 73b are fired toward each other for reconnection.

It is essential that rod 73b retracts from sleeve 73a when the carriage has reached its farthest position in the X direction, in order for the beef trolley to pass to the next station. As a safety measure, a mechanical crank disengagement device 87 has been provided to remedy any defect of cylinder 85. In the event the cylinder 85 fails to operate properly to retract rod 73b, pin 88 will abut an outstanding member to pivot crank 87 in the clockwise direction (with respect to FIG. 7), thereby retracting rod 73b which is connected to crank 87 by suitable fastening means 89.

Main carriage assembly 56 has an operator's station 90 connected thereto. As shown in FIGS. 3 and 4, operator's station 90 comprises a base 92 supported by a number of uprights 94 which are fastened to the carriage assembly 56, a seat 96 attached to base 92 and a control panel 98 which includes a joystick 100 and pushbutton controls (not shown). By moving joystick 100, the operator can control movement of the carriage assemblies 56, 58 in the X and Y directions. Once the carriages are properly aligned in the X and Y directions using the joystick, the operator pushes a pushbutton to operate cylinders 70 and 70', moving the carriage in the Z direction toward the side of beef. The hydraulic cylinders which move the carriage assemblies are coupled so as to move the carriage assemblies in unison.

X-axis carriage 60 moves with respect to Y-axis carriage 64 by sliding along vertically spaced rods 102 which extend in the horizontal, X direction. Y-direction carriage 64 moves vertically with respect to Z-direction carriage 68 along horizontally spaced rods 104 which extend in the vertical, Y direction. Z-direction carriage 68 moves in the Z direction with respect to main drive assemblies 72 along horizontally spaced rods 106 which extend in the horizontal, Z direction. As stated previously, movement is effected by X hydraulic cylinder 62, Y hydraulic cylinder 66 and Z hydraulic cylinder 70.

As shown most clearly in FIGS. 4–6 and 10, carriage assembly 56 comprises a central needle manifold 110 and two horizontally spaced associated needle manifolds 112 and 114. Each of the needle manifolds includes ten injection needles 116, each of which injection needles is coupled to a spring for individual spring loading thereof. This is shown in more detail in FIGS. 8 and 9 in which needle manifold 114 is shown carrying injection needles 116. Injection needles 116 each comprise a forward needle portion and a rear tubular needle holder 118 carrying a sanitary check valve 120. Tubular members 118 are fastened through needle bearing plate 122 to inlet tubing 124, all of which inlet tubing communicates with each other. An inlet tube 126 from one of the volumetric cylinders 40 is coupled to tubing 124.

Needle bearing plate 122 has ten eyelet bolts 128 fastened thereto, each holding a spring 130 which extends from eyelet bolt 128 to pin 132 carried by tubing coupler 134. The above-described spring loading operates to permit injection needles to act relatively independent of each other with respect to insertion. Thus if one of the injection needles hits a bone during injection entry, it will go no further while the other needles continue to extend into the carcass side.

Needle manifold 114 is pivotable with respect to vertical rod 136. Likewise, needle manifold 112 is pivotable with respect to vertical rod 138. As shown in FIG. 5, vertical rods 136 and 138 are each positioned adjacent injection manifold 110 so that injection manifolds 112 and 114 pivot toward each other, as can be readily seen by viewing FIGS. 5 and 6.

Needle manifold 114 has a frame 140 to which sensing means, comprising member 142 and arms 144 carrying rollers 146, are connected. Rollers 146 rotate about pins 148. Member 142 pivots about point 150 and a force upon rollers 146 will cause such pivotal movement, as is illustrated in FIG. 8. Since each side of beef has a different contour, pivotal movement of the sensing system comprising member 142, arms 144 and rollers 146 is effective to aid in directing injection needles 116 into the carcass at a desired angle. An example of the angular direction given needles 116 is shown in dashed line representation in FIG. 8.

Figure 6:
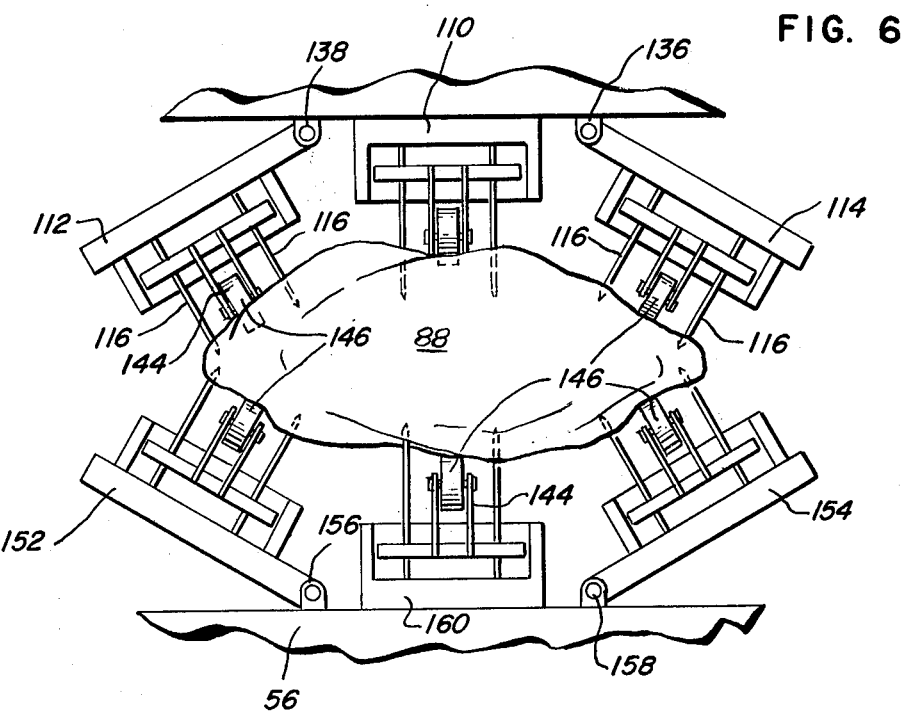
FIG. 6 is a cross-sectional view taken along the plane of the line 6—6 of FIG. 2.

Referring to FIG. 6, it is seen that while outside needle manifolds 112 and 114 pivot about axes 138 and 136, respectively, needle manifold 110 is stationary. Likewise, outside manifolds 152 and 154 carried by main carriage 56 pivot about rods 156 and 158, respectively, attached to manifolds 56, while needle manifold 160 remains stationary. It has been found that needle manifold 110 can be omitted whereby carriage assembly 58 will have pivotable manifolds 112 and 114 and carriage assembly 56 will have pivotable manifolds 152, 154 and stationary manifold 160.

Spring holder 122 carrying the needle assembly is movable in the Z direction with respect to frame 140. A bracket 162 is fastened to spring holder 122 to hold one end 164 of spring 166 (FIG. 8), while the other end 168 of spring 166 is fastened to member 170 adjacent frame 140. Each spring holder 122 has a spring 166 on opposite sides thereof.

In the FIG. 8 illustration, the needle assembly is shown in its rearward position. When rollers 146 sense a side of beef and pivot rearwardly to close a microswitch, hydraulic cylinder 172 is actuated to force the needle assembly forward in the Z direction and into the side of beef. Only central needle manifolds 110 and 160 are utilized to close the microswitches, but both rollers of both manifolds must be contacting the side of beef (and thus be pivoted), with all four microswitches actuated simultaneously, to actuate cylinders 172 of all of the needle assemblies.

The same signal that actuates cylinders 172 causes a hydraulic pancake cylinder 173 of brake mechanism 175 to operate a toggle mechanism, clamping control rod 177 (FIG. 10). This prevents needle manifold 112 from pivoting on vertical rod 138 while the needles are being inserted. Similar brake mechanisms are connected to the other three outside needle manifolds 114, 152, 154. When the needles are withdrawn and reach their full return position, a signal will cause cylinders 70, 70' to withdraw the system along the Z axis. The same signal is utilized to release brake mechanism 175.

Prior to injection, as shown in FIG. 8, the tips of needles 116 are behind the forward edges of rollers 142. In this manner, there is no needle contact with the meat until cylinders 172 are actuated.

The operation at station IV is as follows. When the beef trolley 84, carrying side of beef 88, engages members 73a, 73b, a microswitch is engaged. Because of variations in carcass contour, the operator adjusts the carriage assemblies by moving joystick 100, so that the carriage assemblies are adjusted in both the X and Y directions to best position the injection needles in relation to the individual rounds. The hydraulic cylinders of carriage assembly 58 operate together with the hydraulic cylinders of carriage assembly 56 so that carriage assembly 58 pantomines (traces) the adjusting motions of the operator as he adjusts carriage assembly 56 in the X and Y directions.

Once the operator is satisfied with the carriage positions relative to the carcass, he depresses the pushbuttons on panel 98 which lock the manifolds into position and operate cylinders 70, 70' to move the carriages toward each other in the Z direction. The needle manifolds, substantially encircling the round, engage the round and when all four microswitches are closed as described above, the needle assemblies are driven by hydraulic cylinders 172 into the side of beef. As stated previously, the needles are individually spring-loaded within the manifolds to compensate for variations in carcass curvatures and serving as safety mechanisms in the event of bone obstructions.

When the needles have been inserted into the side beef, a signal is transmitted to servo-mechanism 36 to start the fluid injection system. The fluid injection system operates in the manner discussed previously. Upon completion of the fluid injection cycle, hydraulic cylinders 172 are powered to retract the needle assemblies and the injection needles are automatically withdrawn from the side of beef. When the needles are retracted, the Z axis hydraulic cylinder 70 is automatically actuated in order to move the carriage structure away from the side of beef and the same signal also actuates the hydraulic cylinder to draw members 73a and 73b away from each other. The beef trolley can then travel to station V and the main drive assemblies 72 and 72' willl return to their original position by means of pneumatic cylinders 80, 80'. Cylinders 80, 80' operate after a switch is actuated to signal that members 73a and 73b have been retracted to permit the beef trolley to pass. will The side of beef will now move into station V where the operator manually places needle manifolds into the prescribed area of the forequarter (rib) section. After processing at station V, the carcasses are returned to the main beef rail and are weighed at scale 44 as described previously. The carcasses are then shrouded, in the conventional manner, and travel on to the chill room.

Although an illustrative embodiment of the invention has been shown and described, it is to be understood that various modifications and substitutions may be made by those skilled in the art without departing from the novel spirit and scope of the present invention.

What is claimed is:

1. In a meat tenderizing system in which a tenderizing solution is injected into a carcass after slaughter at a tenderizing station, the improvement comprising, in combination: a carriage assembly carrying a needle manifold with a plurality of generally parallel injection needles for injecting tenderizing solution into the carcass; an overhead conveyor system for conveying the carcass to the tenderizing station along a path transverse to the axes of said injection needles; means for selectively moving the carriage assembly in at least two directions to position the injection needles relative to the carcass; and means for automatically injecting and withdrawing said needles into and out of said carcass.

2. In a meat tenderizing solution is injected into a carcass after slaughter, the improvement comprising, in combination: a carriage assembly carrying a needle manifold with a plurality of generally parallel injection needles coupled to said manifold; means for conveying the carcass along a path transverse to the axes of said injection needles; means for driving said carriage assembly along a track; control means for actuating said driving means; means for driving said needle manifold toward and away from said carcass; and further including sensing means carried by said needle manifold and adapted for engagement with said carcass, said sensing means being operable to pivot said needle manifold so as to aim said injection needles into said carcass at a desirable angle.

3. In a meat tenderizing system as described in claim 2, including individual springs coupled to individual injection needles to spring-load said needles individually with respect to said manifold.

4. In a meat tenderizing system as described in claim 2, including a second carriage assembly carrying a needle manifold with a plurality of generally parallel injection needles coupled to said manifold; said second carriage assembly being oppositely positioned with respect to said first mentioned carriage assembly so as to permit said carcass to be conveyed along a longitudinal path intermediate said first mentioned carriage assembly and said second carriage assembly.

5. In a meat tenderizing system as described in claim 2, wherein said conveying means comprises a trolley engagable with said carriage assembly.

6. In a meat tenderizing system as described in claim 2, wherein said means for driving said needle manifold includes a hydraulic cylinder.

7. In a meat tenderizing system as described in claim 2, wherein said carriage assembly carries a plurality of spaced needle manifolds, each of said needle manifolds having the plurality of individually spring-loaded injection needles.

8. In a meat tenderizing system as described in claim 2, including injection lines coupled to said needle manifold; means responsive to needle insertion for actuating fluid injection means; and means for automatically withdrawing said injection needles after fluid injection.

9. In a meat tenderizing system as described in claim 2, including means for returning said carriage assembly back to its original position with respect to said longitudinal path subsequent to injection of a carcass and preparatory to an injection of a following carcass.

10. In a meat tenderizing system as described in claim 4, said carriage assembly driving means being operable for driving said second carriage assembly, with said first mentioned carriage assembly, along a track generally parallel to said longitudinal path.

11. In a meat tenderizing system as described in claim 5, wherein said carriage assembly carries an outstanding member adapted for engagement by said trolley, whereby forward movement of said trolley will operate to urge said carriage assembly forwardly.

12. In a meat tenderizing system as described in claim 7, at least one of said needle manifolds being pivotable with respect to said carriage assembly about a vertical axis.

13. In a meat tenderizing system as described in claim 4, wherein said first mentioned carriage assembly includes three horizontally spaced needle manifolds and said second carriage assembly comprises two horizontally spaced needle manifolds, with the outer two needle manifolds of said first mentioned carriage assembly being pivotable about a vertical axis and the needle manifolds of the second carriage assembly being pivotable about a vertical axis.

14. In a meat tenderizing system as described in claim 11, wherein said outstanding member includes a retractable portion operable to retract and permit passage of said trolley after completion of the injection.

15. In a meat tenderizing system in which a tenderizing solution is injected into a carcass after slaughter, the improvement comprising, in combination: a needle manifold; a plurality of injection needles coupled to said manifold; spring means coupled to said injection needles for permitting different longitudinal thrusts of different needles; and automatic means for metering selected amounts of tenderizing solution to said needles in response to the weight of the carcass.

16. In a meat tenderizing system as described in claim 15, including pivotal means for coupling said needle manifold to a carriage assembly, said pivotal means permitting pivotable movement of said manifold about a vertical axis.

17. In a meat tenderizing system in which a tenderizing solution is injected into a carcass after slaughter, the improvement comprising, in combination: a needle manifold; a plurality of injection needles coupled to said manifold; spring means coupled to said injection needles for permitting different longitudinal thrusts of different needles; means for coupling an injection line to said needle manifold; and means coupled to said needle manifold for sensing the carcass contour, said sensing means being operable to permit pivotable movement of said needle manifold thereby directing said injection needles coupled to said needle manifold into said carcass at a desirable angle.

18. In a meat tenderizing system as described in claim 17, said sensing means comprising a pair of rollers connected to said needle manifold and horizontal pivot means for permitting pivotal movement of said needle manifold about a horizontal axis.

19. In a meat tenderizing system in which a tenderizing solution is injected into a carcass after slaughter, the improvement comprising, in combination: a carriage assembly carrying a needle manifold with a plurality of generally parallel injection needles coupled to said manifold; means for conveying the carcass along a path transverse to the axes of said injection needles; means for driving said carriage assembly along a track; control means for actuating said driving means; means for driving said needle manifold toward and away from said carcass;

a second carriage assembly carrying a needle manifold with a plurality of generally parallel injection needles coupled to said manifold; said second carriage assembly being oppositely positioned with respect to said first mentioned carriage assembly so as to permit said carcass to be conveyed along a longitudinal path intermediate said first mentioned carriage assembly and said second carriage assembly;

wherein said first mentioned carriage assembly includes three horizontally spaced needle manifolds and said second carriage assembly comprises two horizontally spaced needle manifolds, with the outer two needle manifolds of said first mentioned carriage assembly being pivotable about a vertical axis and the needle manifolds of the second carriage assembly being pivotable about a vertical axis;

and including means carried by said needle manifolds for sensing the contour of said carcass and for urging pivotable movement of said needle manifolds to direct said injection needles into said carcass at a desirable angle.

20. In a meat tenderizing system in which a tenderizing solution is injected into a carcass after slaughter, the improvement comprising, in combination: a carriage assembly carrying a needle manifold with a plurality of generally parallel injection needles coupled to said manifold; means for conveying the carcass along a path transverse to the axis of said injection needles, said conveying means comprising a trolley engagable with said carriage assembly, said carriage assembly carrying an outstanding member adapted for engagement by said trolley, said outstanding member including a retractable portion, said outstanding member being located so as to permit said trolley to urge said carriage assembly forwardly and being operable to retract and permit passage of said trolley after completion of the injection; operator-controlled means for driving said carriage assembly along a horizontal track and along a vertical track; and means for sensing the contour of the carcass without penetrating said carcass, said sensing means being engagable with said carcass to position said injection needles at a desired angle with respect to said carcass.

21. In a meat tenderizing system in which a tenderizing solution is injected into a carcass after slaughter, the improvement comprising, in combination: a carriage assembly carrying a needle manifold with a plurality of generally parallel injection needles coupled to said manifold; means for conveying the carcass along a path transverse to the axis of said injection needles, said conveying means comprising a trolley engagable with said carriage assembly, said carriage assembly carrying an outstanding member adapted for engagement by said trolley, said outstanding member including a retractable portion, said outstanding member being located so as to permit said trolley to urge said carriage assembly forwardly and being operable to retract and permit passage of said trolley after completion of the injection; operator-controlled means for driving said carriage assembly along a horizontal track and along a vertical track; and means for sensing the contour of the carcass, said sensing means being engageable with said carcass to position said injection needles at a desired angle with respect to said carcass; said sensing means comprising a pair of rollers connected to said needle manifold and horizontal pivot means for permitting pivotal movement of said needle manifold about the horizontal axis.

22. In a meat tenderizing system in which a tenderizing solution is injected into a carcass after slaughter, the improvement comprising, in combination: a carriage assembly carrying a needle manifold with a plurality of generally parallel injection needles coupled to said manifold; means for conveying the carcass along a path transverse to the axes of said injection needles; means for driving said carriage assembly along a track; control means for actuating said driving means; means for driving said needle manifold toward and away from said carcass; said needle manifold being pivotable with respect to said carriage assembly and including sensing means for sensing the contour of the carcass, said sensing means being engageable with said carcass to position said injection needles at a desired angle with respect to said carcass.

* * * * *

UNITED STATES PATENT AND TRADEMARK OFFICE
CERTIFICATE OF CORRECTION

PATENT NO. : 3,971,088
DATED : July 27, 1976
INVENTOR(S) : William J. Osiadacz

It is certified that error appears in the above-identified patent and that said Letters Patent are hereby corrected as shown below:

Column 4, line 56, delete "weighted" and insert therefor -- weighed --.

Column 6, line 9, delete "the" second occurrence, and insert -- that --.

Column 8, line 23, after "side" insert -- of --;
line 36, delete "willl" and insert therefor -- will --;
line 41, delete "will".

Claim 2, line 1, after "tenderizing", insert -- system in which a tenderizing --.

Signed and Sealed this

First Day of November 1977

[SEAL]

Attest:

RUTH C. MASON
Attesting Officer

LUTRELLE F. PARKER
Acting Commissioner of Patents and Trademarks